United States Patent Office 3,030,816
Patented Apr. 24, 1962

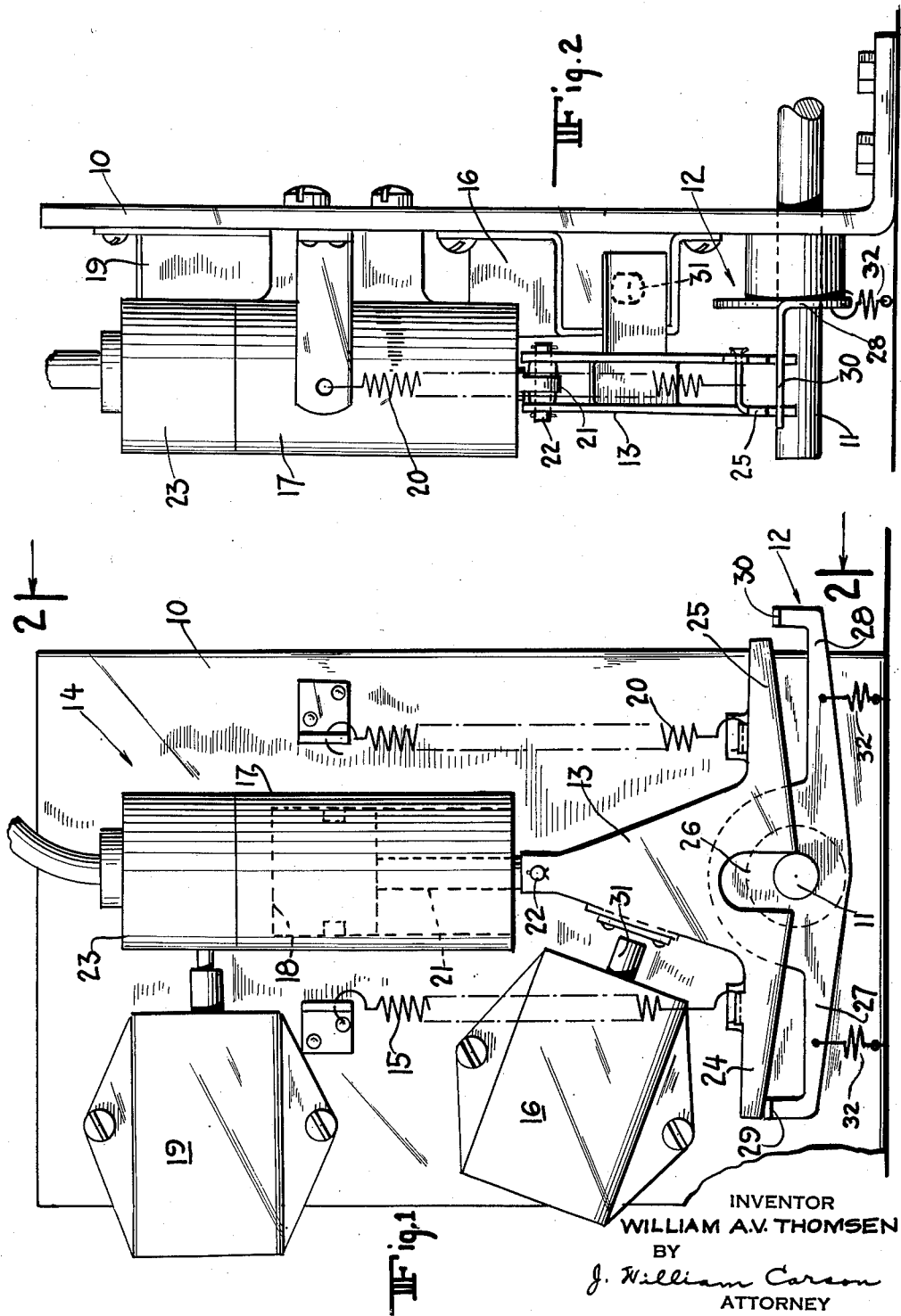

3,030,816
CONTROL DEVICE
William A. V. Thomsen, Glen Ridge, N.J., assignor to Specialties Development Corporation, Belleville, N.J., a corporation of New Jersey
Filed June 3, 1960, Ser. No. 33,763
10 Claims. (Cl. 74—99)

The present invention relates to control devices, and, more particularly, to a device for effecting rotation of a shaft in either a clockwise or counter-clockwise direction to reverse the position of an element to be controlled such as a valve, vane, rudder or the like.

Accordingly, an object of the present invention is to provide such a control device which is constructed of a minimum number of parts, is light in weight and compact in arrangement.

Another object is to provide such a device which is simple and economical in construction and is reliable in operation.

A further object is to provide such a device which is adapted to be controlled from a remote location to operate the same.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is an elevational view of a control device in accordance with the present invention.

FIG. 2 is a side view of the device.

Referring to the drawing in detail, there is shown a control device which generally comprises a mounting plate 10, a shaft 11 journalled for rotation on the plate, a rocker member 12 mounted on the shaft for rotation therewith, a pivotally mounted control member 13 for selectively moving the rocker member in either direction, motor means 14 mounted on the mounting plate 10 for moving the control member, first means such as a spring 15 for rocking the control member in one direction and second means such as a solenoid 16 on the mounting plate 10 for rocking the control member in the opposite direction.

The motor means 14 as shown herein is a compressed gas operated device including a cylinder 17, a reciprocatable piston 18 in the cylinder adapted to be moved in one direction by gas under pressure admitted into the cylinder by a three way valve 23 (not shown in detail) controlled by a solenoid 19, and a tension spring 20 for moving the piston in the opposite direction. An element such as a stem 21 is secured to the piston for reciprocating movement therewith and has the control member 13 pivotally mounted thereon at its free end by a pin 22.

The control member 13 is a plate having a pair of arms 24 and 25 and having a slot 26 midway between the arms through which the shaft 11 extends. The spring 15 is under tension and has one end connected to the mounting plate 10 and has its other end connected to the arm 24 to normally urge the control member 13 in a clockwise direction as viewed.

When the spring 15 is arranged substantially parallel to the stem 21 of the piston as shown, the spring 20 can be dispensed with because the spring 15 then also serves as a return spring for the piston 18. However, two springs preferably are utilized with the spring 15 somewhat stronger than the spring 20, whereby the force of the spring 15 overcomes the force of the spring 20 to normally urge the control plate to the position shown and both springs act as return springs for the piston. By reason of this unbalanced spring arrangement, only a small force need be exerted by the solenoid 16 to position the plate 13 for reverse operation as will be described hereinafter.

The rocker member 12 is a crank having a pair of arms 27 and 28 respectively adjacent the arms 24 and 25. The arms 24, 25, 27 and 28 are provided with cooperating portions for selectively effecting engagement between the arms 24 and 27 and the arms 25 and 28. This may be accomplished by making one pair of arms shorter than the other pair and providing the longer arms with an extension. For example, the arms 24 and 25 are shorter and the arms 27 and 28 are provided with extensions 29 and 30 at the ends thereof.

In order that either the end of the arm 24 engages the extension 29 or the end of the arm 25 engages the extension 30, the width of the slot 26 exceeds the diameter of the shaft 11 by a dimension which slightly exceeds the thickness or lengthwise dimension of the extensions 29 and 30 and the combined length of the arms 27 and 28 exceeds the combined length of the arms 24 and 25 by a similar dimension so that, when the end of the arm 24 engages the extension 29, the end of the arm 25 is inward of the extension 30 and out of engagement therewith, and vice versa.

The solenoid 16 has a stem 31 moved by the armature thereof which stem is adapted to engage the same end of the control plate 13 to which the spring 15 is connected to rock the control plate in a counter-clockwise direction as viewed.

In operation with the piston 18 in its upper position and the rocker crank 12 in a horizontal or neutral position, as shown in the drawing, and the solenoid 16 de-energized, the arm 24 engages the extension 29, the arm 25 is out of engagement with the extension 30 and the shaft 11 is engaged by the right side of the slot 26 by reason of the tension spring 15, whereupon, when the solenoid 19 is operated to cause the valve 23 to admit gas to the cylinder 17, the piston 18 moves downwardly to cause the arm 24 to rock the arm 27 in a counter-clockwise direction so that the crank 12 turns the shaft 11 in a similar direction. The solenoid 19 is then de-energized whereby the valve 23 vents the gas in the cylinder to allow the piston 18 to return to its upper position and the shaft 11 and the crank 12 are returned to their neutral position by return springs 32.

In order to turn the shaft 11 in a reverse or clockwise direction, the solenoid 16 is first energized to rock the plate 13 in a counter-clockwise direction so that the left side of the slot 26 engages the shaft 11 and the end of the arm 25 overlies the extension 30 with the arm 24 out of engagement with the extension 29. Thus, when the piston 18 is caused to move to its lower position by actuation of the valve 23, the arm 25 rocks the arm 28 in a clockwise direction so that the crank 12 turns the shaft 11 in a similar direction.

When the solenoids 16 and 19 are de-energized, the spring 15 positions the plate 13 for effecting counter-clockwise rotation of the shaft 11 the next time the solenoid 19 is energized, and the shaft 11 and the crank 12 are returned to their neutral position by the springs 32.

From the foregoing description, it will be seen that the present invention provides a simple and practical control device which acts as a reversing mechanism for turning a shaft back and forth. By reason of the motor means, rocker crank and control plate arrangement considerable torque can be applied to the shaft while utilizing lightweight solenoids which have a very small output force.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A control device comprising a rotatably mounted shaft, a rocker member mounted on said shaft for rotation therewith having a pair of elongate arms extending radially of said shaft in substantially opposite directions, a slidably mounted element, motor means for reciprocating said element in a lineal direction, a control member pivotally mounted on said element having a pair of elongate arms substantially parallel to and adjacent said arms of said rocker member, said rocker member and said control member arms being constructed and arranged for selectively engaging each other at the respective ends thereof, first means for moving said control member about its pivot to cause one of said arms of said control member to engage one of said arms of said rocker member whereby upon movement of said element said shaft will be rotated in one direction, and second means for moving said control member about its pivot to cause the other arm of said control member to engage the other arm of said rocker member whereby upon movement of said element said shaft will be rotated in the opposite direction.

2. A control device according to claim 1, wherein said first means includes a spring under tension having one end connected to one end of said control member.

3. A control device according to claim 2, wherein said motor means effects movement of said element in a direction to cause rotation of said shaft and said spring effects movement of said element in the opposite direction.

4. A control device according to claim 2, wherein said first means includes a second spring under tension which is weaker than said first mentioned spring and has one end connected to the opposite end of said control member and both of said springs effect return movement of said element.

5. A control device according to claim 2, wherein said second means is power operated and includes an element for engaging the end of said control member to which said spring is connected.

6. A control device according to claim 5, wherein said first means includes a second spring under tension which is weaker than said first mentioned spring and has one end connected to the opposite end of said control member and both of said springs effect return movement of said element.

7. A control device according to claim 1, wherein the arms of one of said members are shorter than the arms of said other member and the longer arms have an extension at the ends thereof for selectively engaging the ends of the shorter arms.

8. A control device according to claim 7, wherein said control member has the shorter arms.

9. A control device according to claim 7, wherein said control member has a slot through which said shaft extends, the width of said slot exceeding the diameter of said shaft by a dimension slightly exceeding the thickness of said extensions, whereby when said shaft is at one side of said slot only the arms at one side of said members can engage each other.

10. A control device comprising a rotatably mounted shaft, a rocker crank mounted on said shaft for rotation therewith having a pair of radially extending arms, a reciprocatable element slidably mounted for linear movement, motor means for moving said element downwardly upon energization thereof, a plate pivotally mounted on said element at the lower end thereof having a pair of arms adjacent said arms of said rocker member and having a slot in which said shaft is disposed, said rocker crank arms having an upwardly facing extension at the ends thereof for selectively being engaged by one of said arms of said plate, spring means for moving said plate about its pivot to cause one of its arms to engage one of said extensions of said rocker crank whereby upon downward movement of said element said shaft will be rotated in one direction, and solenoid for moving said plate about its pivot to cause its other arm to engage the other extension of said rocker crank whereby upon downward movement of said element said shaft will be rotated in the opposite direction, said spring means being connected to said rocker crank for moving said element upwardly upon de-energization of said motor means.

References Cited in the file of this patent

UNITED STATES PATENTS

| | | |
|---|---|---|
| 1,572,240 | McKeown | Feb. 9, 1926 |
| 2,053,886 | Williams | Sept. 8, 1936 |
| 2,558,953 | Henninger et al. | July 3, 1951 |